(12) United States Patent
Vagelos

(10) Patent No.: US 10,880,525 B2
(45) Date of Patent: Dec. 29, 2020

(54) BODY WORN VIDEO DEVICE AND PROCESS HAVING CELLULAR ENABLED VIDEO STREAMING

(71) Applicant: TracFone Wireless, Inc., Miami, FL (US)

(72) Inventor: Theodore Vagelos, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 162 days.

(21) Appl. No.: 15/669,088

(22) Filed: Aug. 4, 2017

(65) Prior Publication Data

US 2018/0041735 A1 Feb. 8, 2018

Related U.S. Application Data

(60) Provisional application No. 62/370,982, filed on Aug. 4, 2016.

(51) Int. Cl.
*H04N 7/18* (2006.01)
*G06F 3/16* (2006.01)
*G08B 25/01* (2006.01)
*G08B 21/04* (2006.01)

(52) U.S. Cl.
CPC ........... *H04N 7/185* (2013.01); *G08B 25/016* (2013.01); *G06F 3/167* (2013.01); *G08B 21/043* (2013.01)

(58) Field of Classification Search
CPC ................................ H04N 7/185; G06F 3/167
See application file for complete search history.

(56) References Cited

U.S. PATENT DOCUMENTS

| | | | | |
|---|---|---|---|---|
| 2014/0082208 A1* | 3/2014 | Ojanpera | ........... | H04N 21/2743 709/231 |
| 2014/0092299 A1* | 4/2014 | Phillips | ................ | H04N 5/2252 348/376 |
| 2014/0160304 A1* | 6/2014 | Galor | ..................... | H04N 5/232 348/207.1 |
| 2014/0227671 A1* | 8/2014 | Olmstead | ............... | G11B 27/10 434/308 |
| 2015/0063777 A1* | 3/2015 | Letke | ..................... | A42B 1/244 386/224 |
| 2016/0119667 A1* | 4/2016 | Layson, Jr. | ........ | H04N 21/6131 386/226 |
| 2018/0103206 A1* | 4/2018 | Olson | .................. | H04N 5/2252 |

* cited by examiner

*Primary Examiner* — Tsion B Owens
(74) *Attorney, Agent, or Firm* — BakerHostetler

(57) ABSTRACT

A body worn video device including a camera device configured to capture video images, a transceiver configured to transmit and stream the video images over a network to a video receiving computer for at least one of the following: viewing on a display or storage in a database, a video capturing input device configured to receive an input to initiate operation of the camera device and initiate video streaming by the transceiver, a processor configured to control the camera device and the transceiver based on the video capturing input device, and a housing configured to house the camera device, the transceiver, the video capturing input device, and the processor. The video capturing input device and the processor are configured to initiate operation of the camera device and initiate video streaming by the transceiver in response to operation of the video capturing input device.

20 Claims, 4 Drawing Sheets

BODY WORN VIDEO DEVICE AND PROCESS HAVING CELLULAR ENABLED VIDEO STREAMING

CROSS REFERENCE TO PRIOR APPLICATIONS

This application claims the benefit of U.S. Provisional Application No. 62/370,982 filed on Aug. 4, 2016, which is hereby incorporated by reference in its entirety for all purposes as if fully set forth herein.

BACKGROUND OF THE DISCLOSURE

1. Field of the Disclosure

This disclosure relates generally to body cameras or body worn video device having cellular enabled video streaming. This disclosure also relates generally to a process for streaming video over a cellular network from body cameras or body worn video device.

2. Related Art

Body cameras, body worn video (BWV) or body-worn cameras, are a video recording system that is typically utilized by law enforcement to record their interactions with the public or gather video evidence at crime scenes, and have been shown to increase both officer and citizen accountability. BWVs are notable because their placement, often on the front of a shirt, provides for first-person perspective and a more complete chain of evidence.

Police body cameras have been proven to be an effective way to monitor police behavior. Video recording devices may also provide documented footage into the behavior of law enforcement officers, video(s) can be used in a court of law and the cameras can encourage honesty and dispel any false accusations made by any parties. Body cameras can promote positive, civilized and appropriate behaviors. Body cameras worn by police have been shown to increase accountability of police in some instances. However, BWVs typically function only to capture and store video content, which limits any real time benefit to the BWV.

Accordingly, there is a need for a body worn video system configured to provide real-time wireless video streaming.

SUMMARY OF THE DISCLOSURE

The foregoing needs are met, to a great extent, by the disclosure, with a process and device for implementing a body worn video device and process to provide real-time wireless video streaming.

In one or more aspects, a body worn video device includes a camera device configured to capture video images, a transceiver configured to transmit and stream the video images over a network to a video receiving computer for at least one of the following: viewing on a display or storage in a database, a video capturing input device configured to receive an input to initiate operation of the camera device and initiate video streaming by the transceiver, a processor configured to control the camera device and the transceiver based on the video capturing input device, a housing configured to house the camera device, the transceiver, the video capturing input device, and the processor, the video capturing input device comprising an input device configured as at least one of the following: a button arranged on the housing and a touchscreen arranged in a display of the housing.

In a further aspect, a process of implementing body worn video device includes capturing video images with a camera device, transmitting and streaming the video images over a network to a video receiving computer with a transceiver for at least one of the following: viewing on a display or storage in a database, receiving an input to initiate operation of the camera device and initiate video streaming by the transceiver with a video capturing input device, controlling the camera device and the transceiver with a processor based on the video capturing input device, arranging the camera device, the transceiver, the video capturing input device, and the processor in a housing, where the video capturing input device comprises an input device configured as at least one of the following: a button arranged on the housing and a touchscreen arranged in a display of the housing.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
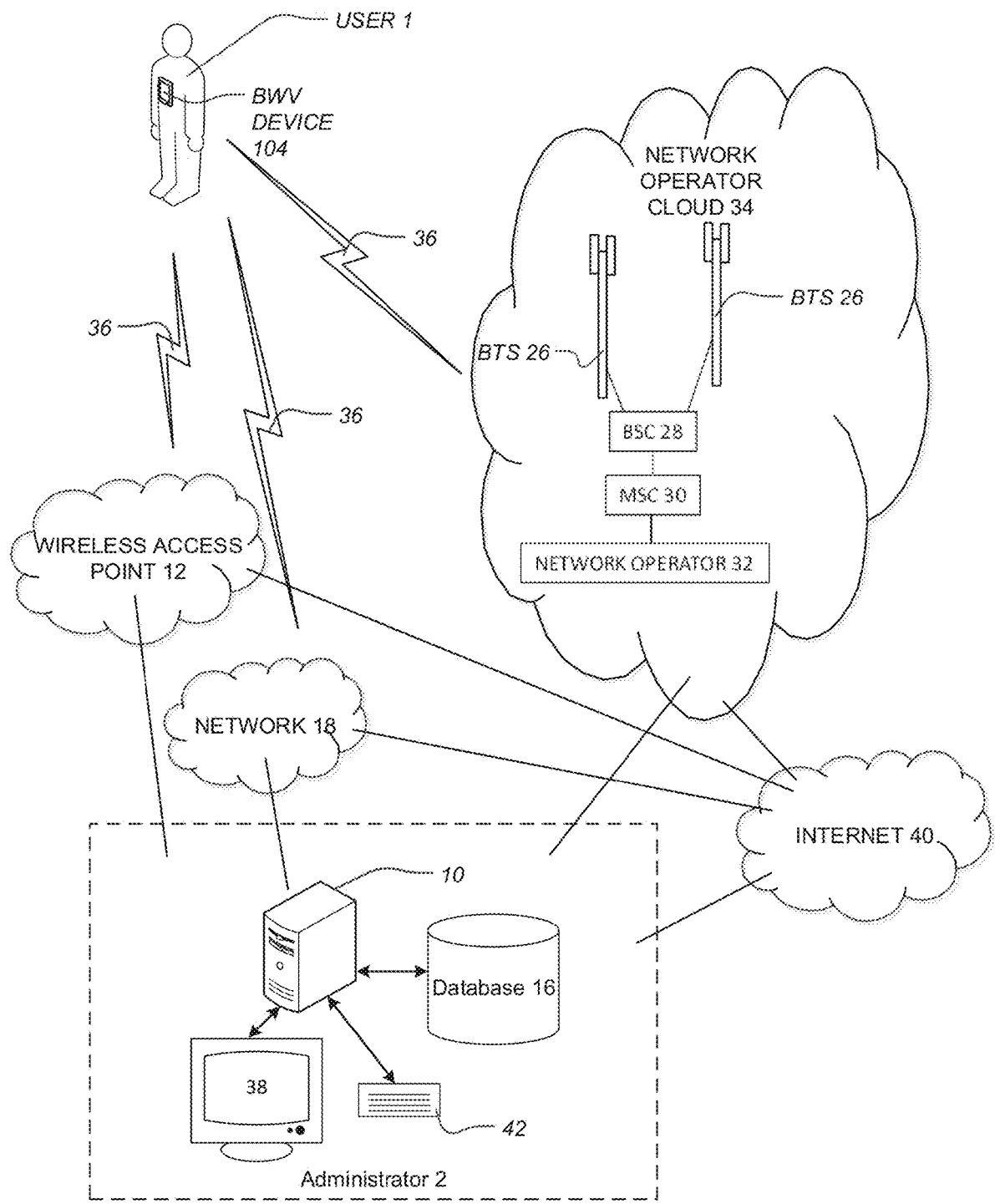
FIG. 1 illustrates an exemplary body worn video system with associated components, in accordance with aspects of the present disclosure.

Reference in this specification to a body worn video device is intended to encompass devices such as smartphones, mobile phones, tablet computers, MP3 players and the like. Reference to a "body worn video" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "body worn video" may be interchangeably used and referred to herein as "wireless device," "wireless handset," "handset," "mobile device," "device," "mobile phones," "mobile equipment," "mobile station," "user equipment," "cellular phone," "smartphones," or "phone."

Body worn videos may connect to a "wireless network" or "network" and are intended to encompass any type of wireless network to obtain wireless services through the use of a body worn video, such as the Global System for Mobile Communication (GSM) network, Code-Division Multiple Access (CDMA) network GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, a communication channel as defined herein, or the like, and/or a combination of two or more thereof, that may utilize the teachings of the present application to allow a body worn video to connect to a wireless network to stream the video in real time.

Reference in the specification to a user (user 1) is meant to apply to any individual that may use a body worn video device including law enforcement officers, first responders, physicians, nurses, schoolteachers, construction workers, the elderly, schoolchildren, and the like. An administrator (administrator 2) is meant to apply to any entity or individual that is overseeing the user 1 including a law enforcement dispatcher, a law enforcement supervisor, a hospital administrator, a school administrator, a parent, and the like. In one aspect, user 1 is a law enforcement officer and the administrator 2 is a police department including a police department dispatcher and/or a police department supervisor.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

The disclosure sets forth a body worn video system that is safer in that it can stream video in real time to other individuals or entities such that these other individuals or entities may take appropriate action based on the content of the video. Moreover, the body worn video system in some aspects may be automatic based on environmental sounds and actions sensed by the body worn video device. Additionally, the body worn video system may be remotely actuated, which is beneficial as the user of the body worn video device may not always be in a position to initiate video streaming. Moreover, the body worn video system of the disclosure may stream video to a remote location which results in a more robust storage of the video content which is not subject to loss if the body worn video device is damaged, stolen, lost, or the like.

FIG. 1 illustrates an exemplary body worn video system with associated system components, in accordance with aspects of the disclosure. In particular, FIG. 1 shows a body worn video device 104 and a network operator cloud 34. The body worn video device 104 may be attached, held and/or carried by the user 1, such as a law-enforcement officer. For example, the body worn video device 104 may include structure to be mounted to the front of the user 1, such as their shirt, vest, lapel, and the like. When mounted to the front of the user 1 in such a manner, the body worn video device 104 provides a first-person perspective view and captures video and streams the video of this view from the user 1 with a camera device 126. As described in detail below, the body worn video device 104 is configured to capture video events associated with the user 1 and stream the video over a communication channel 36, as defined herein, to a video stream receiving computer 10. In one aspect, the video stream receiving computer 10 may be implemented by a server. The network may include the network operator cloud 34, the Internet 40, a network associated with a wireless access point 12 and/or other networks 18. Only one network is necessary for operation of the body worn video device 104. However, multiple networks are contemplated as well to provide improved coverage.

The network operator cloud 34 may include a base transceiver station 26 (BTS), a base station controller 28 (BSC), and a mobile switching center 30 (MSC) overseen by a network operator 32. Other types of wireless networks 12, 18 utilizing a communication channel as defined herein are contemplated as well. The network operator cloud 34 may communicate with the body worn video device 104 over a communication channel 36 as defined herein. The network operator cloud 34 may further communicate over the Internet 40 to the video stream receiving computer 10. The video stream receiving computer 10 may further communicate over the Internet 40 and/or the network operator cloud 34 to the body worn video device 104. In one aspect, the video stream receiving computer 10 may implement web-based communications and commands. The use of the network operator cloud 34 may be beneficial to the user 1 as there are few geographical limitations. Anywhere the user 1 goes, there is likely access to the network operator cloud 34 to stream video events and provide assistance.

The administrator 2 may access the video stream receiving computer 10 and a database 16. The video stream receiving computer 10 may be configured to receive video stream content over the Internet 40, directly from the network operator cloud 34, from the wireless access point 12, and/or another network 18 via a communication channel as defined herein. The video stream receiving computer 10 may be configured to store the video stream content in the database 16. The video stream receiving computer 10 may also be configured to display the streamed video on a display 38. The display 38 may be any type of electronic display configured to display video content.

The video stream receiving computer 10 may be configured to transmit commands to the body worn video device 104 through input device 42 such as a keyboard. The commands may include initiation of video streaming, the stopping of video streaming, location requests, and the like. The video stream receiving computer 10 may be configured to further send messages, text messages, email messages, alerts, and the like to the body worn video device 104. The video stream receiving computer 10 may be configured to further receive messages, text messages, email messages, alerts, locations, and the like from the body worn video device 104.

In one aspect, the video stream may be compressed using a video codec such as H.264, HEVC, VP8 or VP9. The H.264 or MPEG-4 Part 10, Advanced Video Coding (MPEG-4 AVC) is a block-oriented motion-compensationbased video compression standard. The High Efficiency Video Coding (HEVC), also known as H.265, is a video compression standard. It supports resolutions up to 8192×4320, including 8K UHD. The VP8 is a video compression format owned by Google and created by On2 Technologies as a successor to VP7. The VP9 is an open video coding format developed by Google. Other video compression processes are contemplated as well.

In one aspect, encoded audio and video streams may be assembled in a container bitstream such as MPEG-4, FLV, WebM, ASF or ISMA. The MPEG-4 is a method of defining compression of audio and visual (AV) digital data. Uses of MPEG-4 include compression of AV data for web (streaming media) and CD distribution, voice (telephone, videophone) and broadcast television applications. The Flash Video is a container file format used to deliver video over the Internet using Adobe Flash Player version 6 and newer. Flash Video content may also be embedded within SWF files. There are two different video file formats known as Flash Video: FLV and F4V. The audio and video data within FLV files may be encoded in the same manner as they are within SWF files. The F4V file format is based on the ISO base media file format. Both formats are supported in Adobe Flash Player and developed by Adobe Systems. WebM is a video file format. The Advanced Systems Format (ASF) is Microsoft's proprietary digital audio/digital video container format, especially meant for streaming media. ASF is part of the Media Foundation framework. ASF is based on serialized objects which are essentially byte sequences identified by a GUID marker. The Internet Streaming Media Alliance (ISMA) describes payload formats, resolves various options and includes ISMA 1.0, ISMA 2.0, ISMACryp, and the like. Other processes are contemplated as well.

The bitstream may be delivered from the body worn video device 104 to the video stream receiving computer 10 using a transport protocol, such as Adobe's RTMP or RTP. In other aspects, technologies such as Apple's HLS, Microsoft's Smooth Streaming, Adobe's HDS and non-proprietary formats such as MPEG-DASH may enable adaptive bitrate streaming over HTTP. A streaming transport protocol may be used to send video to a cloud transcoding service and Content Delivery Network (CDN), which then use HTTP based transport protocols to distribute the video. The streaming client may interact with the streaming server using a control protocol, such as Multimedia Messaging Service (MMS) or Real Time Streaming Protocol (RTSP). Other transport protocols are contemplated as well.

Figure 2:
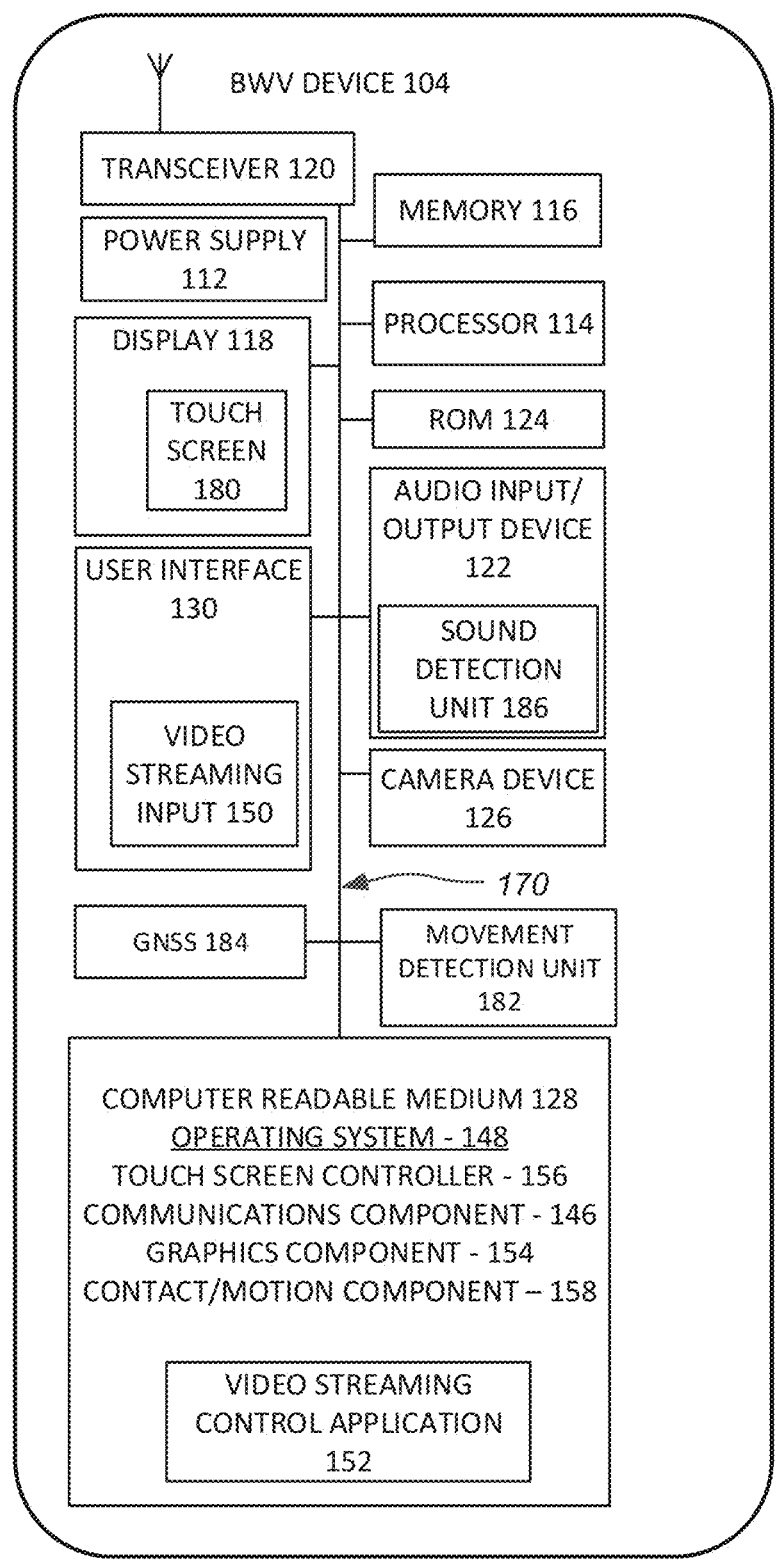
FIG. 2 shows the details of an exemplary body worn video device in accordance with aspects of the disclosure.

FIG. 2 shows the details of an exemplary body worn video device in accordance with aspects of the disclosure. The body worn video device 104 may include a processor 114, a memory 116, a display 118, a user interface 130, and the like. The processor 114 may be a central processing unit, microprocessor, dedicated hardware, or the like configured to execute instructions including instructions related to software programs. The display 118 may be a liquid crystal display having a backlight to illuminate the various color liquid crystals to provide a colorful display. The user interface 130 may be any type of physical input having one or more buttons, switches, and the like and/or may be implemented as a touchscreen 180. In one aspect, the body worn video device 104 may be implemented with a wireless phone or the like configured to provide the additional functionality as defined herein.

The body worn video device 104 may further include in the memory 116 or separate from the memory 116, a computer readable memory 128, an operating system 148, a communication component 146, a contact/motion component 158, a touchscreen controller 156, a graphics component 154 and the like. The operating system 148 together with the various components providing software functionality for each of the components of the body worn video device 104. The body worn video device 104 may further include a read-only memory 124 (ROM) and a power supply 112 such as a battery.

The memory 116 may include a high-speed random-access memory. Also, the memory 116 may be a non-volatile memory, such as magnetic fixed disk storage, flash memory or the like. The various components of the body worn video device 104 may be connected through various communication lines including a data bus 170.

Additionally, the body worn video device 104 may include an audio input/output device 122. The audio input/output device 122 may include speakers, speaker outputs, and in the like, providing sound output; and may include microphones, microphone inputs, and the like, for receiving sound inputs. The audio input/output device 122 may include an analog to digital converter and a digital to audio converter for audio input and output functions respectively.

The body worn video device 104 may include a transceiver 120 and the like. The body worn video device 104 may provide radio and signal processing as needed to access a network for services over a communication channel as defined herein. The processor 114 and the transceiver 120 may be configured to process video streaming, call functions, data transfer, and the like and provide other services to the user 1.

The touchscreen 180 of the disclosure may be implemented in the display 118 and may detect a presence and location of a touch of a user within the display area. For example, touching the display 118 of the body worn video device 104 with a finger or hand. The touchscreen 180 may also sense other passive objects, such as a stylus.

In operation, the display 118 may display various objects associated with applications for execution by the processor 114. In this regard, a user may touch the display 118, and in particular the touchscreen 180, to interact with the objects. For example touching an object may execute an application in the processor 114 associated with the object that is stored in memory 116. Additionally or alternatively, touching an object may open a menu of options to be selected by the user. The display 118 may include a plurality of the objects for the user to interact with. Moreover the display 118 may include a plurality of screens. The display 118 showing one screen at a time. The user may interact with the display 118 to move a screen into view on the display 118. Various objects may be located in the each of the screens.

The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

Figure 3:
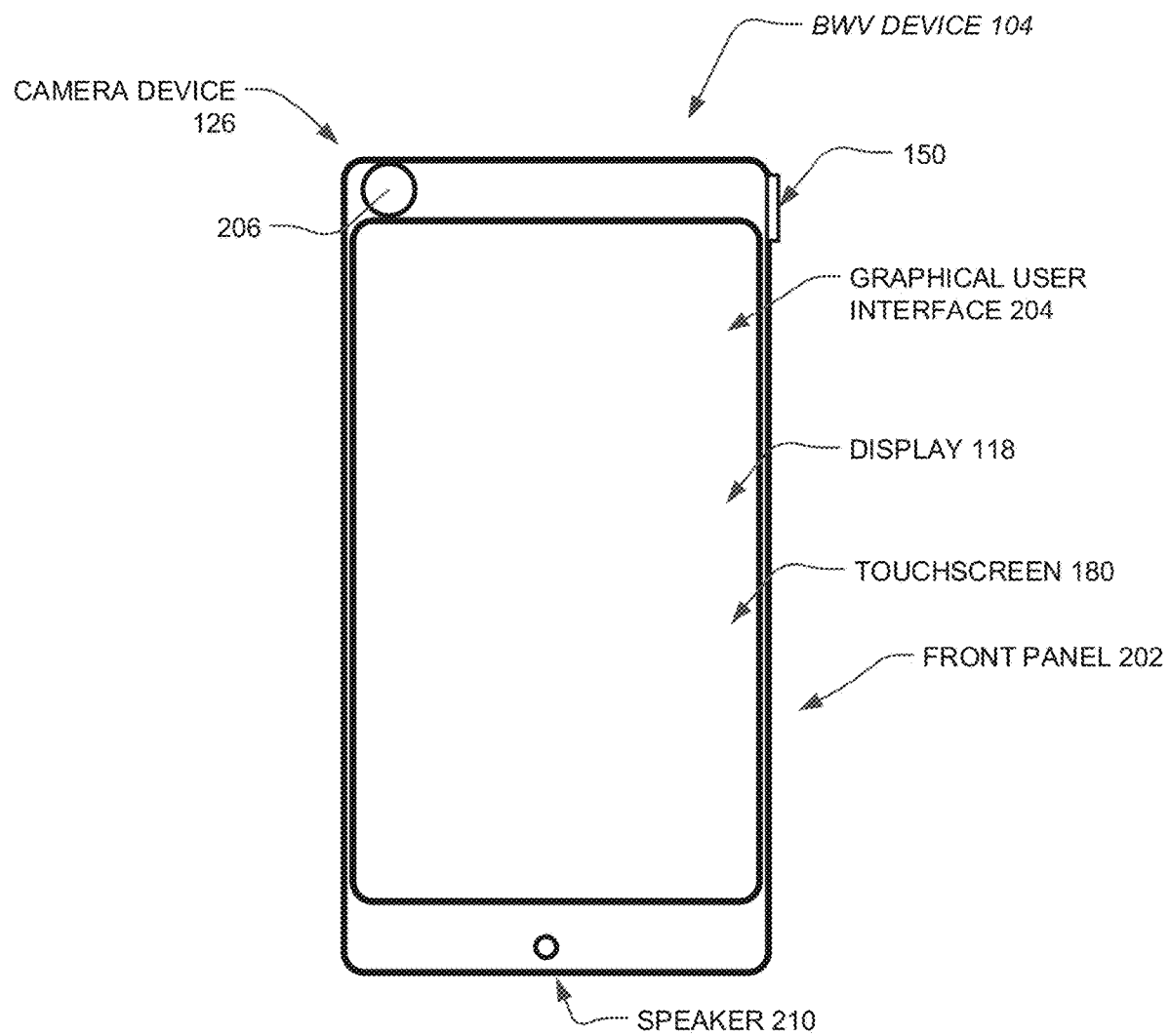
FIG. 3 shows the details of an exemplary body worn video device in accordance with aspects of the disclosure.

The body worn video device 104 may include a camera device 126. The camera device 126 can include one or more cameras to provide visual input. The body worn video device 104 can include, for example, one camera device 126 on the back side of the body worn video device 104 and another camera device 126 on the front side of the body worn video device 104. The camera device 126 can also capture video in combination with audio from a microphone of the audio input/output device 122. The camera device 126 may include a charge coupled device (CCD), CMOS image sensors, Back Side Illuminated CMOS, or the like. Images captured by the camera device 126 may be converted and stored in various formats including a JPEG file format, RAW feature format such as the Android (operating system) 5.0 Lollipop, and the like. The camera device 126 may include a lens 206 as shown in FIG. 3.

The camera device 126 may operate in conjunction with a video streaming control application 152. The video streaming control application 152 may be stored in the memory 116, the computer readable memory 128, or the like. The video streaming control application 152 may provide full functionality for the camera device 126 to capture images, convert images into a desired format, stream the video content over a communication channel as defined herein, store the images in the memory 116 or the computer readable memory 128, or the like.

In one aspect, the audio input/output device 122 may include microphones, microphone inputs, and the like, for receiving sound inputs. In this aspect, the audio input/output device 122 in conjunction with the video streaming control application 152 may capture sounds related to the video and stream the sounds as well to the video stream receiving computer 10.

The body worn video device 104 may include a movement detection unit 182. The movement detection unit 182 may include a number of sensors to detect a movement by the user 1. In particular, the movement detection unit 182 may detect a movement indicating unusual or specific movement (unusual activity) by the user 1 suggesting an event that should be subject to video streaming by the body worn video device 104. The movement may include falling, jumping, sudden impact, running, and the like. The movement detection unit 182 may be implemented by any one or more of accelerometers, gyroscopes, altitude sensors, and/or the like. The movement detection unit 182 may further include analog-to-digital converters, filters, and the like to process the signals associated with any of the sensors. In one aspect, the video streaming control application 152 may implement video streaming when the unusual or specific movement is detected. The data associated with an unusual movement detected by the movement detection unit 182 may be forwarded to the processor 114 in conjunction with the video streaming control application 152. Thereafter, the transceiver 120 may communicate the data associated with unusual movement over a network to the video stream receiving computer 10. The video streaming control application 152 may implement various aspects of the disclosure including the video streaming process 400 illustrated in FIG. 4.

In one aspect, the audio input/output device 122 may include microphones, microphone inputs, and the like, for receiving sound inputs. In particular, the audio input/output device 122 may detect unusual or specific sounds (unusual activity) by the user 1 suggesting an event that should be subject to video streaming by the body worn video device 104. The unusual or specific sounds may include shouting, yelling, loud voices, gunshots, and the like. In one aspect, the video streaming control application 152 may implement video streaming when the unusual or specific sounds are detected. In one aspect, the audio input/output device 122 may be implemented as a sound detection unit 186. In one aspect, the sound detection unit 186 may be implemented as a separate device that may include an analog to digital converter.

The computer readable medium 128 may be configured to store the video streaming control application 152. For the purposes of this disclosure, the computer readable medium 128 stores computer data, which may include computer program code that may be executable by the processor 114 of the body worn video device 104 in machine readable form. By way of example, and not limitation, the computer readable medium 128 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 128 or machine readable medium, which may be incorporated into a computer program product.

According to another aspect of the disclosure, the body worn video device 104 and/or the video stream receiving computer 10 may estimate the location of the body worn video device 104 based, at least in part, on a global navigation satellite system (GNSS 184). In another aspect, a network operator cloud 34 may implement location determination based on a specific cell in which the body worn video device 104 connects. In yet another aspect, a network operator cloud 34 may obtain location determination based on triangulation with respect to a plurality of cells in which the body worn video device 104 receives signals.

The body worn video may include a video stream input 150. In one aspect, operating the video stream input 150 may implement the video streaming control application 152 and the associated camera device 126 to start capturing video and stream the video to the video stream receiving computer 10. The video stream input 150 may be a button, switch, touch sensitive area, or the like. In one aspect the video stream input 150 may be a button. In one aspect the video stream input 150 may be a button that is recessed into body worn video device 104 to limit inadvertent pressing. In one aspect, the video stream input 150 may operate in conjunction with the video streaming control application 152. In one aspect, the video stream input 150 may operate in conjunction with the user interface 130. In one aspect, the video stream input 150 may be implemented as a button that is responsive to a single click, a double-click, a triple click, an extended hold or pressing and/or the like. In one aspect, the video stream input 150 may be associated with a particular application stored on the body worn video device 104 and implemented in conjunction with the video streaming control application 152 as described in further detail below. In one aspect, the video stream input 150 may be implemented with the audio input/output device 122 that may include microphones, microphone inputs, and the like, for receiving sound inputs. In this aspect, the video stream input 150 may be initiated by voice recognition from the user 1. For example, the user 1 may provide a voice command of "stream," for example, that may be interpreted by voice recognition software to implement video streaming. Other types of word based commands are contemplated as well, along with a number of other associated types of functionality.

FIG. 3 shows a front panel of the body worn video in accordance with aspects of the disclosure. In particular, FIG. 3 shows a front panel 202 of the body worn video device 104. The front panel 202 may include the display 118 and a graphical user interface 204 that may implement the touchscreen 180. The front panel 202 may further include the camera device 126 and the lens 206. In one aspect, the front panel 202 may be a generally flat surface. FIG. 3 further shows the video stream input 150 implemented as a button arranged adjacent the front panel 202. FIG. 3 further shows the video stream input 150 implemented as a speaker 210 arranged on the front panel 202.

Figure 4:
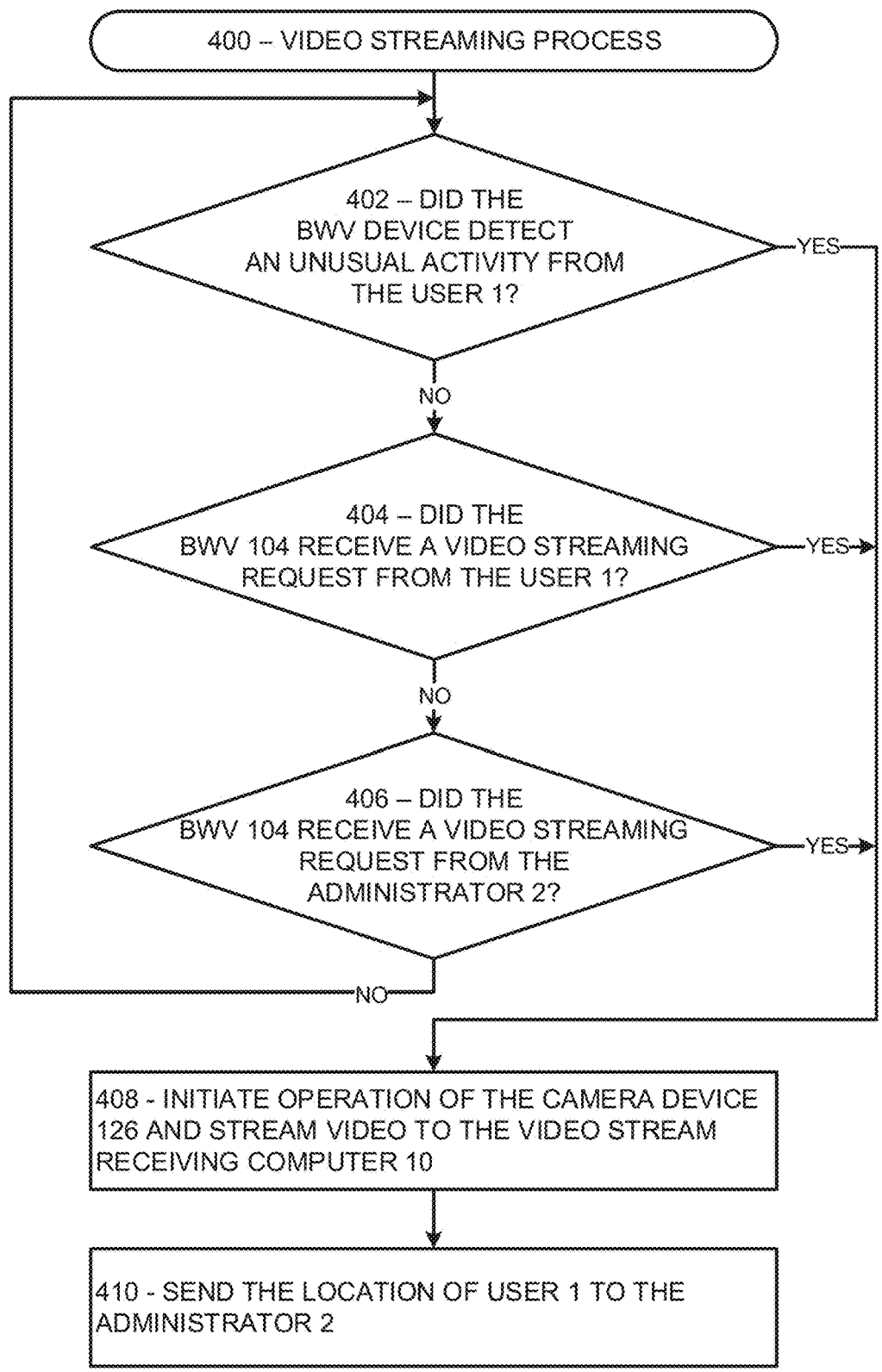
FIG. 4 shows a process of operating the body worn video device in accordance with aspects of the disclosure.

FIG. 4 shows a process of operating the body worn video in accordance with aspects of the disclosure. In particular, FIG. 4 shows a video streaming process 400 that may be implemented by the body worn video device 104.

In box 402, the movement detection unit 182, as described above, can determine whether there is unusual movement (unusual activity) by the user 1. In particular, the movement detection unit 182 may detect a movement indicating unusual or specific sounds movement by the user 1 suggesting an event that should be subject to video streaming by the body worn video device 104. The movement may include falling, jumping, sudden impact, running, and the like. If the movement detection unit 182 detects an unusual movement, the process 400 advances to box 408. Otherwise, if the movement detection unit 182 does not detect an unusual movement, the process 400 advances to box 404.

Alternatively or additionally, box 402 can determine whether there are unusual sounds around the user 1 (unusual activity). In particular, the audio input/output device 122 may detect a sound indicating unusual activity by the user 1 suggesting an event that should be subject to video streaming by the body worn video device 104. The sound may include shouting, yelling, loud voices, gunshots, and the like. If the audio input/output device 122 detects an unusual sound, the process 400 advances to box 408. Otherwise, if the audio input/output device 122 does not detect an unusual sound, the process 400 advances to box 404.

In box 404, the process determines whether the body worn video device 104 has received a video streaming request from the user 1. The video stream input 150 may be a button, switch, touch sensitive area, voice command, or the like. In one aspect the video stream input 150 may be a button. In one aspect, the video stream input 150 may be implemented with a speaker and the audio input/output device 122 so as to receive voice commands. In one aspect, the video stream input 150 may operate in conjunction with the user interface 130. In one aspect, the video stream input 150 may be implemented as a button that is responsive to a single click, a double-click, a triple click, an extended hold or pressing and/or the like. In one aspect, the video stream input 150 may be associated with a particular application stored on the body worn video device 104 and implemented in conjunction with the video streaming control application 152. If the video stream input 150 is actuated, the process 400 advances to box 408. Otherwise, if the video stream input 150 is not actuated, the process 400 advances to box 406.

In box 406, the process 400 determines whether the body worn video device 104 has received a video streaming request from the administrator 2. In this regard, the administrator 2 may determine that the user 1 requires real-time video streaming for a particular situation. Accordingly, the administrator 2 can initiate a video stream request in the video stream receiving computer 10. This video stream request may be sent to the body worn video device 104 over one or more of the Internet 40, network operator cloud 34, wireless access point 12, and/or network 18 on a communication channel as defined herein. If video stream request has been received, the process 400 advances to box 408. Otherwise, if there is no video stream request the process 400 advances back to box 402.

In box 408, the body worn video device 104 may initiate operation of the camera device 126 and stream video to the video stream receiving computer 10. In one aspect, the video streaming control application 152 and the associated camera device 126 may start capturing video and stream the video to the video stream receiving computer 10 as described above.

Finally, in box 410 the body worn video device 104 may send the location of user 1 to the administrator 2. In this regard, the body worn video device 104 and/or the video stream receiving computer 10 may estimate the location of the body worn video device 104 based, at least in part, on a global navigation satellite system (GNSS 184). In another aspect, a network operator cloud 34 may implement location determination based on a specific cell in which the body worn video device 104 connects. In yet another aspect, a network operator cloud 34 may obtain location determination based on triangulation with respect to a plurality of cells in which the body worn video device 104 receives signals. Additionally, the body worn video device 104 may send the location of the user 1 to the administrator 2 at any point in time as requested by the administrator 2.

Accordingly, the disclosure has described a body worn video system that is safer in that it can stream video in real time to other individuals or entities such that these other individuals or entities may take appropriate action based on the content of the video. Moreover, the disclosure has described how the body worn video system in some aspects may be automatic based on environmental sounds and actions sensed by the body worn video device. Additionally, the disclosure has described how the body worn video system may be remotely actuated, which is beneficial as the user of the body worn video device may not always be in a position to initiate video streaming. Moreover, the disclosure has described how the body worn video system of the disclosure may stream video to a remote location which results in a more robust storage of the video content which is not subject to loss if the body worn video device is damaged, stolen, lost, or the like.

For the purposes of this disclosure a computer readable medium stores computer data, which data can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

The video streaming control application 152 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Voice recognition software may be utilized in various aspects of the systems and methods. Users may be able to vocalize, rather than utilizing other input processes. For example, the voice recognition software may be configured for generating text from voice input from a microphone or other voice input. A speech signal processor may convert speech signals into digital data that can be processed by the processor. The processor may perform several distinct functions, including serving as the speech event analyzer, the dictation event subsystem, the text event subsystem, and the executor of the application program. The speech signal processor may generate speech event data and transmit this data to the processor to be processed first by the speech event analyzer. The speech event analyzer may generate a list or set of possible candidates among the system recordings that represent or match the voice input processed by the speech signal processor. The speech event analyzer may transmit the candidate sets to a dictation event subsystem.

The dictation event subsystem may analyze the candidate sets and choose the best match candidate with the highest degree of similarity. This candidate is then considered the correct translation, and the dictation event subsystem forwards the translation to the text event subsystem which in turn inputs the translated text into the device.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A body worn video device comprising:
 a wireless device comprising at least one of the following: a wireless phone, a mobile phone, and a smartphone; the wireless device including:
 a camera device configured to capture video images;
 a transceiver configured to transmit and stream the video images over a network to a video receiving computer for at least one of the following: viewing on a video receiving computer display or storage in a video receiving computer database;
 a video capturing input device configured to receive an input to initiate operation of the camera device and initiate video streaming by the transceiver;
 a processor configured to control the camera device and the transceiver based on the video capturing input device;
 a housing configured to house the camera device, the transceiver, the video capturing input device, and the processor;
 the video capturing input device comprising an input device configured as at least one of the following: a button arranged on the housing and a touchscreen arranged in a display of the housing; and
 a location determination device configured to determine a location of the body worn video device and transmit the location of the body worn video device in response to a request received over the network,
 wherein the location determination device operates based on triangulation with respect to a plurality of cell signals;
 wherein the housing is configured to be affixed to a user; and
 wherein the wireless device is configured to send and receive text messages and email messages with the video receiving computer.

2. The body worn video device according to claim 1 further comprising:
 a movement detection unit configured to detect a movement of the housing, the movement detection unit and the processor configured to determine a specific movement, and the movement detection unit includes an analog-to-digital converter and a filter to process signals associated with at least one sensor of the movement detection unit; and
 the video capturing input device configured to be responsive to the movement detection unit detecting the specific movement to initiate operation of the camera device and initiate video streaming by the transceiver in response to operation of the video capturing input device,
 wherein the input device is configured as a touchscreen arranged in a display of the housing.

3. The body worn video device according to claim 2 further comprising:
 a display configured to display objects associated with applications for execution by the processor;
 a memory that stores a video streaming control application executed by processor for implementing the video capturing input device;
 an audio input/output device that includes an analog to digital converter and a digital to audio converter;
 the audio input/output device configured to implement a sound detection unit configured to detect sounds, the sound detection unit and the processor configured to determine a specific sound;
 the video capturing input device comprising the sound detection unit,
 wherein the video capturing input device and the processor are configured to initiate operation of the camera device and initiate video streaming by the transceiver in response to the sound detection unit;
 wherein the specific movement comprises at least one of the following: falling, jumping, sudden impact, or running; and
 wherein the video capturing input device and the processor are configured to initiate operation of the camera device and initiate video streaming by the transceiver in response to a command from the video receiving computer received over the network.

4. The body worn video device according to claim 1 further comprising:
 a memory that stores a video streaming control application executed by processor for implementing the video capturing input device;
 an audio input/output device that includes an analog to digital converter and a digital to audio converter;
 the audio input/output device configured to implement a sound detection unit configured to detect sounds, the sound detection unit and the processor configured to determine a specific sound; and
 the video capturing input device comprising the sound detection unit,
 wherein the video capturing input device and the processor are configured to initiate operation of the camera device and initiate video streaming by the transceiver in response to the sound detection unit; and
 wherein the video streaming control application is downloaded from an application store.

5. The body worn video device according to claim 4 wherein the specific sound comprises at least one of the following: shouting, yelling, loud voices, or gunshots;
 wherein the camera device comprises one camera device on a back side of the housing and another camera device on a front side of the housing; and
 wherein the memory stores a voice recognition software executed by processor for implementing voice commands received by the sound detection unit.

6. The body worn video device according to claim 1 further comprising:
 the video capturing input device configured to receive a request over the network by the transceiver,
 wherein the video capturing input device and the processor are configured to initiate operation of the camera device and initiate video streaming by the transceiver in response to receiving the request over the network by the video capturing input device; and wherein the video capturing input device and the processor are further configured to stop operation of the camera device and stop video streaming by the transceiver in response to receiving the request over the network by the video capturing input device.

7. The body worn video device according to claim 1 further comprising:
a movement detection unit configured to detect a movement of the housing, the movement detection unit and the processor configured to determine a specific movement, and the movement detection unit includes an analog-to-digital converter and a filter to process signals associated with at least one sensor of the movement detection unit;
the video capturing input device configured to be responsive to the movement detection unit detecting the specific movement, wherein the video capturing input device and the processor are configured to initiate operation of the camera device and initiate video streaming by the transceiver in response to the movement detection unit;
an audio input/output device that includes an analog to digital converter and a digital to audio converter;
the audio input/output device configured to implement a sound detection unit configured to detect sounds, the sound detection unit and the processor configured to determine a specific sound;
the video capturing input device comprising the sound detection unit, wherein the video capturing input device and the processor are configured to initiate operation of the camera device and initiate video streaming by the transceiver in response to the sound detection unit;
a display configured to display objects associated with applications for execution by the processor;
a memory that stores a video streaming control application executed by processor for implementing the video capturing input device; and
the video capturing input device configured to receive a request over the network by the transceiver, wherein the video capturing input device and the processor are configured to initiate operation of the camera device and initiate video streaming by the transceiver in response to receiving the request over the network,
wherein the specific movement comprises at least one of the following: falling, jumping, sudden impact, or running;
wherein the input device is configured as a touchscreen arranged in a display of the housing;
wherein the memory stores a voice recognition software executed by processor for implementing voice commands received by the sound detection unit; and
wherein the specific sound comprises at least one of the following: shouting, yelling, loud voices, or gunshots.

8. A system comprising the body worn video device according to claim 1, and further comprising:
the video receiving computer configured to receive the video images streamed over the network;
the video receiving computer display configured to display the video images streamed over the network to the video receiving computer;
the video receiving computer database configured to store the video images streamed over the network to the video receiving computer; and
the video receiving computer further configured to transmit commands to the body worn video device,
wherein the commands transmitted to the body worn video device include at least one of the following: initiation of video streaming, stopping of video streaming, and location requests.

9. The body worn video device according to claim 1 further comprising:
a display configured to display objects associated with applications for execution by the processor; and
a memory that stores a video streaming control application executed by processor for implementing the video capturing input device,
wherein the input device is configured as a touchscreen arranged in a display of the housing; and
wherein the memory stores a voice recognition software executed by processor for implementing voice commands received by a sound detection unit.

10. A process of implementing a body worn video device comprising:
implementing a wireless device comprising at least one of the following: a wireless phone, a mobile phone, and a smartphone;
capturing video images with a camera device;
transmitting and streaming the video images over a network to a video receiving computer with a transceiver for at least one of the following: viewing on a video receiving computer display or storage in a video receiving computer database;
receiving an input to initiate operation of the camera device and initiate video streaming by the transceiver with a video capturing input device;
controlling the camera device and the transceiver with a processor based on the video capturing input device;
determining a location of the body worn video device with a location determination device and transmitting the location of the body worn video device in response to a request received over the network; and
arranging the camera device, the transceiver, the video capturing input device, and the processor in a housing,
wherein the location determination device operates based on triangulation with respect to a plurality of cell signals,
wherein the video capturing input device comprises an input device configured as at least one of the following: a button arranged on the housing and a touchscreen arranged in a display of the housing,
wherein the housing is configured to be affixed to a user, and
wherein the wireless device is configured to send and receive text messages and email messages with the video receiving computer.

11. The process according to claim 10 further comprising:
detecting a movement of the housing with a movement detection unit, the movement detection unit and the processor determining a specific movement, and the movement detection unit includes an analog-to-digital converter and a filter to process signals associated with at least one sensor of the movement detection unit,
wherein the video capturing input device is configured to be responsive to the movement detection unit detecting the specific movement to initiate operation of the camera device and initiate video streaming by the transceiver in response to the movement detection unit,
wherein the input device is configured as a touchscreen arranged in a display of the housing.

12. The process according to claim 11 further comprising:
displaying on a display objects associated with applications for execution by the processor, wherein the specific movement comprises at least one of the following: falling, jumping, sudden impact, or running; and wherein the video capturing input device and the processor are configured to initiate operation of the camera device and initiate video streaming by the transceiver in response to a command from the video receiving computer received over the network.

13. The process according to claim 10 further comprising:

storing in a memory a video streaming control application executed by processor for implementing the video capturing input device;

implementing an audio input/output device that includes an analog to digital converter and a digital to audio converter and the audio input/output device configured to implement a sound detection unit; and detecting sounds with the sound detection unit, the sound detection unit and the processor configured to determine a specific sound, wherein the video capturing input device comprises the sound detection unit;

wherein the video capturing input device and the processor are configured to initiate operation of the camera device and initiate video streaming by the transceiver in response to the sound detection unit; and wherein the video streaming control application is downloaded from an application store.

14. The process according to claim 13 wherein the specific sound comprises at least one of the following: shouting, yelling, loud voices, or gunshots;

wherein the camera device comprises one camera device on a back side of the housing and another camera device on a front side of the housing; and wherein the memory stores a voice recognition software executed by processor for implementing voice commands received by the audio input/output device that implements the sound detection unit.

15. The process according to claim 10 further comprising:

receiving a request over the network by the transceiver with the video capturing input device, wherein the video capturing input device and the processor are configured to initiate operation of the camera device and initiate video streaming by the transceiver in response to receiving the request over the network; and wherein the video capturing input device and the processor are further configured to stop operation of the camera device and stop video streaming by the transceiver in response to receiving the request over the network by the video capturing input device.

16. The process according to claim 10 further comprising:

storing in a memory a video streaming control application executed by processor for implementing the video capturing input device; and displaying on a display objects associated with applications for execution by the processor, detecting a movement of the housing with a movement detection unit, the movement detection unit and the processor configured to determine a specific movement, and the movement detection unit includes an analog-to-digital converter and a filter to process signals associated with at least one sensor of the movement detection unit;

wherein the video capturing input device configured to be responsive to the movement detection unit detecting the specific movement, wherein the video capturing input device and the processor are configured to initiate operation of the camera device and initiate video streaming by the transceiver in response to the movement detection unit;

detecting sounds with an audio input/output device that includes an analog to digital converter and a digital to audio converter and the audio input/output device configured to implement a sound detection unit, the sound detection unit and the processor configured to determine a specific sound;

wherein the video capturing input device comprises the sound detection unit, wherein the video capturing input device and the processor are configured to initiate operation of the camera device and initiate video streaming by the transceiver in response to the sound detection unit; and receiving a request over the network by the transceiver with the video capturing input device, wherein the video capturing input device and the processor are configured to initiate operation of the camera device and initiate video streaming by the transceiver in response to receiving the request over the network, wherein the specific movement comprises at least one of the following: falling, jumping, sudden impact, or running;

wherein the input device is configured as a touchscreen arranged in a display of the housing;

wherein the memory stores a voice recognition software executed by processor for implementing voice commands received by the sound detection unit; and wherein the specific sound comprises at least one of the following: shouting, yelling, loud voices, or gunshots.

17. The process according to claim 10, further comprising:

receiving the video images streamed over the network with the video receiving computer;

displaying the video images streamed over the network to the video receiving computer on the video receiving computer display; and storing the video images streamed over the network to the video receiving computer in the video receiving computer database; and transmitting commands to the body worn video device from the video receiving computer, wherein the commands transmitted to the body worn video device include at least one of the following: initiation of video streaming, stopping of video streaming, and location requests.

18. The process according to claim 10 further comprising:

storing in a memory a video streaming control application executed by processor for implementing the video capturing input device;

displaying on a display objects associated with applications for execution by the processor;

wherein the input device is configured as a touchscreen arranged in a display of the housing; and wherein the memory stores a voice recognition software executed by processor for implementing voice commands received by an audio input/output device that includes an analog to digital converter and a digital to audio converter and the audio input/output device configured to implement a sound detection unit.

19. A process of implementing a body worn video device comprising:

implementing a wireless device comprising at least one of the following: a wireless phone, a mobile phone, and a smartphone;

capturing video images with a camera device;

transmitting and streaming the video images over a network to a video receiving computer with a transceiver for at least one of the following: viewing on a video receiving computer display or storage in a video receiving computer database;

receiving an input to initiate operation of the camera device and initiate video streaming by the transceiver with a video capturing input device;

controlling the camera device and the transceiver with a processor based on the video capturing input device;

determining a location of the body worn video device with a location determination device and transmitting the location of the body worn video device in response to a request received over the network;

arranging the camera device, the transceiver, the video capturing input device, and the processor in a housing;

detecting a movement of the housing with a movement detection unit, the movement detection unit and the processor determining a specific movement, and the movement detection unit includes an analog-to-digital converter and a filter to process signals associated with at least one sensor of the movement detection unit, storing in a memory a video streaming control application executed by processor for implementing the video capturing input device;

implementing an audio input/output device that includes an analog to digital converter and a digital to audio converter and the audio input/output device configured to implement a sound detection unit; and detecting sounds with the sound detection unit, the sound detection unit and the processor configured to determine a specific sound, wherein the location determination device operates based on triangulation with respect to a plurality of cell signals, wherein the video capturing input device comprises an input device configured as at least one of the following: a button arranged on the housing and a touchscreen arranged in a display of the housing, wherein the housing is configured to be affixed to a user, wherein the wireless device is configured to send and receive text messages and email messages with the video receiving computer, wherein the video capturing input device is configured to be responsive to the movement detection unit detecting the specific movement to initiate operation of the camera device and initiate video streaming by the transceiver in response to the movement detection unit, and wherein the video capturing input device and the processor are configured to initiate operation of the camera device and initiate video streaming by the transceiver in response to the sound detection unit.

20. The process according to claim 19, further comprising:

receiving the video images streamed over the network with the video receiving computer;

displaying the video images streamed over the network to the video receiving computer on the video receiving computer display; and storing the video images streamed over the network to the video receiving computer in the video receiving computer database; and transmitting commands to the body worn video device from the video receiving computer, wherein the commands transmitted to the body worn video device include at least one of the following: initiation of video streaming, stopping of video streaming, and location requests.

* * * * *